(12) United States Patent
Stromberg et al.

(10) Patent No.: US 11,913,214 B2
(45) Date of Patent: Feb. 27, 2024

(54) BIORETENTIONAL SYSTEM AND METHOD OF CONSTRUCTION THEREOF

(71) Applicant: Infra-SGA, Inc., Norfolk, VA (US)

(72) Inventors: Timothy J. Stromberg, Virginia Beach, VA (US); Sean Garrigan, Jenkintown, PA (US); Michael P. Stromberg, Somerville, NJ (US)

(73) Assignee: Infra-SGA, Inc., Norfolk, VA (US)

( * ) Notice: Subject to any disclaimer, the term of this patent is extended or adjusted under 35 U.S.C. 154(b) by 392 days.

(21) Appl. No.: 17/295,601

(22) PCT Filed: Jan. 3, 2020

(86) PCT No.: PCT/US2020/012132
§ 371 (c)(1),
(2) Date: May 20, 2021

(87) PCT Pub. No.: WO2020/146199
PCT Pub. Date: Jul. 16, 2020

(65) Prior Publication Data
US 2022/0018110 A1  Jan. 20, 2022

Related U.S. Application Data

(60) Provisional application No. 62/789,053, filed on Jan. 7, 2019.

(51) Int. Cl.
*E03F 5/10* (2006.01)
*E03F 1/00* (2006.01)
(52) U.S. Cl.
CPC .............. *E03F 5/10* (2013.01); *E03F 1/00* (2013.01); *E03F 1/005* (2013.01)

(58) Field of Classification Search
CPC ... E03F 1/00; E03F 1/002; E03F 1/005; E03F 5/04; E03F 5/0401; E03F 5/10
USPC .......................................................... 405/114
See application file for complete search history.

(56) References Cited

U.S. PATENT DOCUMENTS

| | | | |
|---|---|---|---|
| 5,249,885 A * | 10/1993 | Florence | E03F 1/002 405/38 |
| 5,368,416 A | 11/1994 | Cataldo | |
| 6,371,699 B1 | 4/2002 | Weinreb | |
| 6,884,002 B1 * | 4/2005 | Fuller | E02B 7/22 52/282.1 |

(Continued)

FOREIGN PATENT DOCUMENTS

| CN | 107254886 A | 10/2017 |
|---|---|---|
| CN | 108221547 A | 6/2018 |

(Continued)

*Primary Examiner* — Frederick L Lagman
(74) *Attorney, Agent, or Firm* — The Webb Law Firm

(57) ABSTRACT

A bioretention system includes a number of connected wall portions defining an enclosure. Each wall portion includes a pair of spaced supports that support one or more panels that are interlocked with the pair of supports via mating interlocking features. Where a wall portion includes an upper panel atop of a lower panel, a lower edge of the upper panel and a top edge of the lower panel are in contact with each other to form the wall portion. The supports are then connected in spaced relation on the transverse axis by internal bars or beams which provide support for the wall portions without the need for external soil reinforcement.

15 Claims, 11 Drawing Sheets

(56) References Cited

U.S. PATENT DOCUMENTS

| | | | |
|---|---|---|---|
| 7,364,385 B1* | 4/2008 | Luke | E02B 3/102 |
| | | | 405/114 |
| 7,615,148 B1 | 11/2009 | Gentry | |
| 7,690,865 B1* | 4/2010 | Stewart | E02B 3/108 |
| | | | 405/114 |
| 8,535,533 B2 | 9/2013 | Allard | |
| 9,469,981 B2* | 10/2016 | Allard | E03F 1/00 |
| 9,512,606 B2* | 12/2016 | Allard | E03F 1/002 |
| 9,732,508 B1* | 8/2017 | Kent | E03F 1/005 |
| 2010/0193418 A1 | 8/2010 | Belasco | |
| 2011/0120922 A1 | 5/2011 | Wilhelms et al. | |
| 2012/0031854 A1* | 2/2012 | Allard | E03F 5/14 |
| | | | 210/163 |
| 2012/0152827 A1 | 6/2012 | Allard | |
| 2013/0206662 A1* | 8/2013 | Wilhelms | E04G 21/14 |
| | | | 210/170.03 |

FOREIGN PATENT DOCUMENTS

| | | |
|---|---|---|
| CN | 108589896 A | 9/2018 |
| JP | 2009138396 A | 6/2009 |
| KR | 1020130063783 A | 6/2013 |
| KR | 101578551 B1 * | 12/2015 |
| WO | 9920846 A1 | 4/1999 |

* cited by examiner

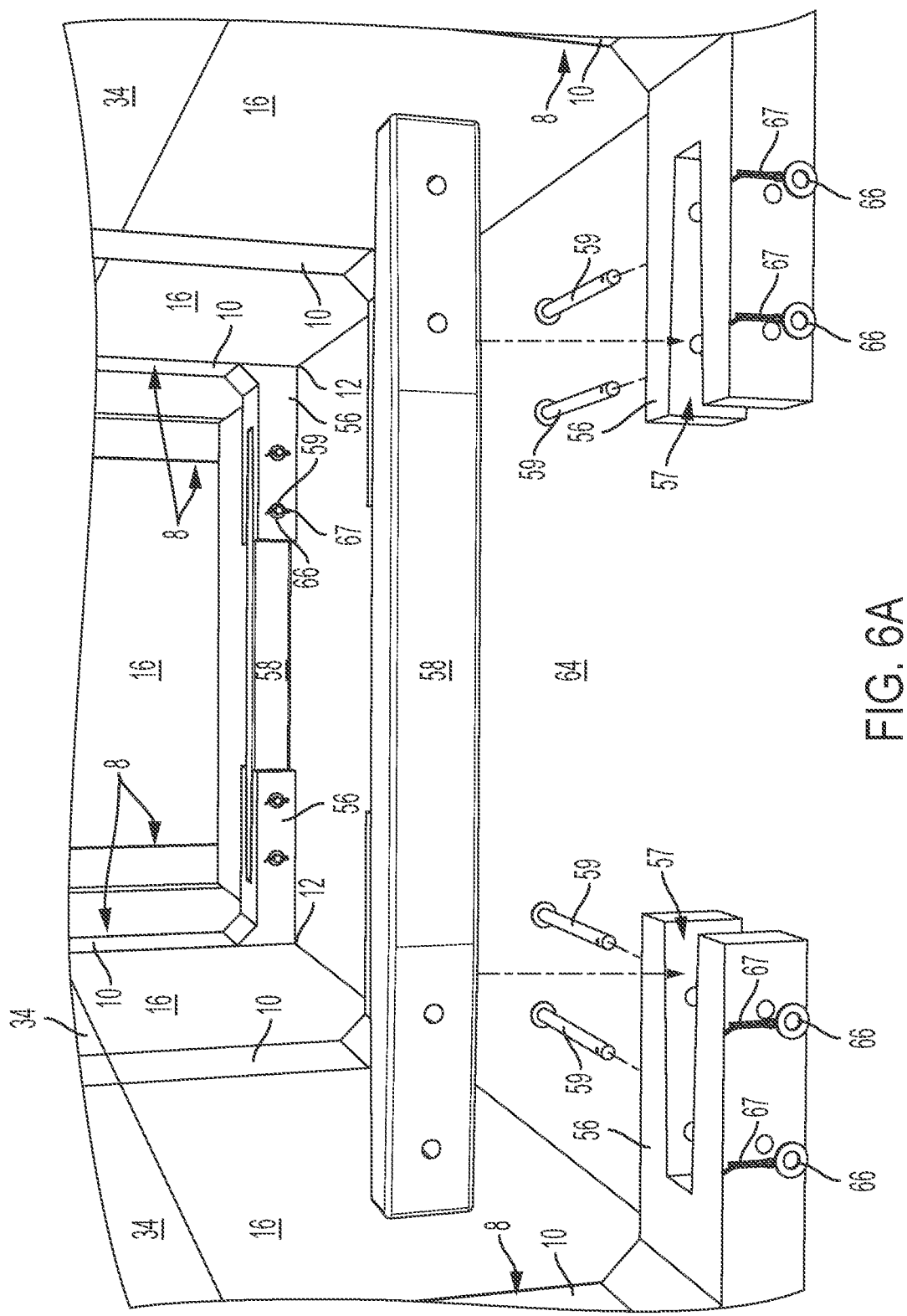

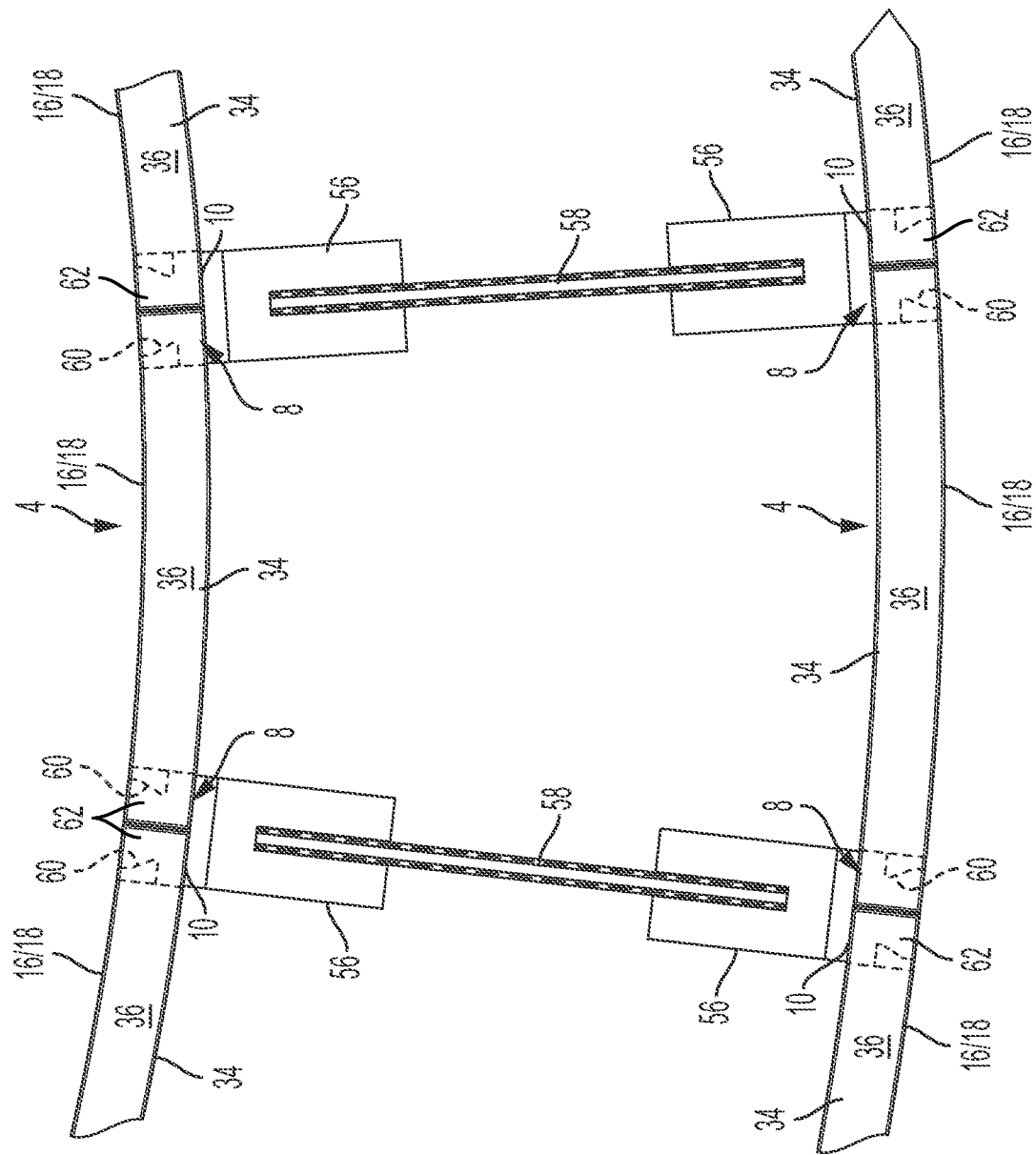

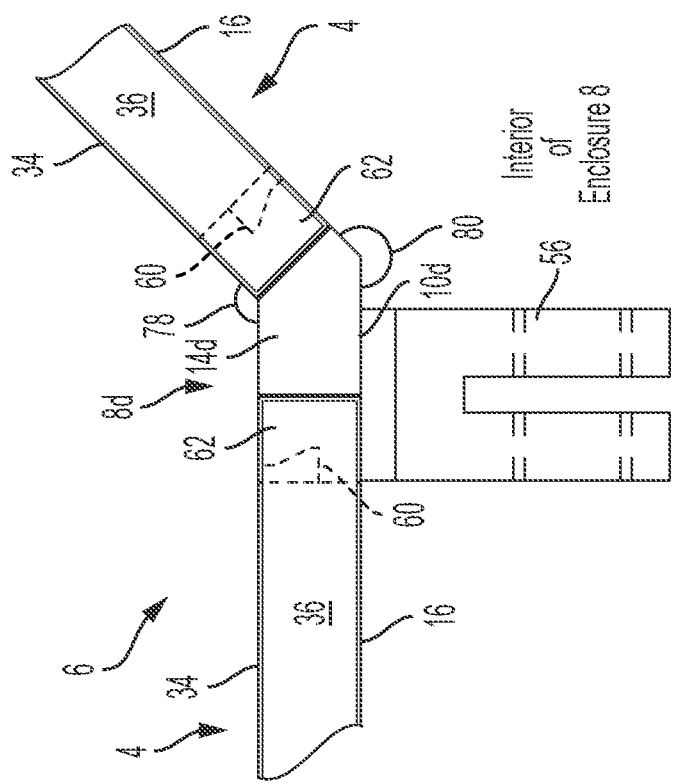
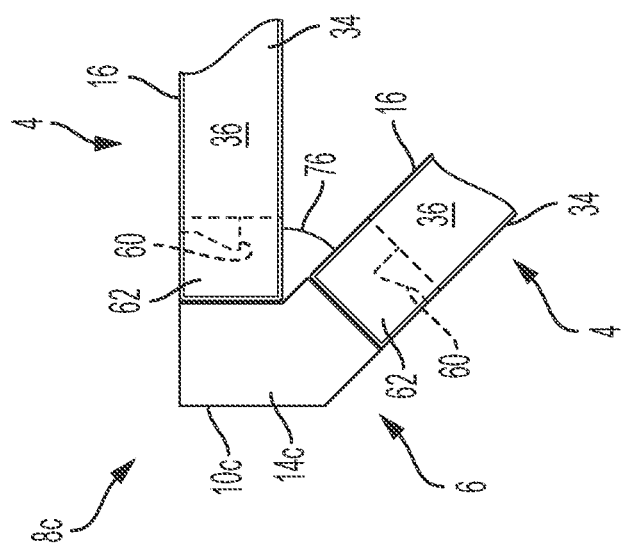
FIG. 9B
FIG. 9A

BIORETENTIONAL SYSTEM AND METHOD OF CONSTRUCTION THEREOF

CROSS REFERENCE TO RELATED APPLICATIONS

This application is the United States national phase of International Application No. PCT/US2020/012132 filed Jan. 3, 2020, and claims the benefit of U.S. Provisional Patent Application No. 62/789,053 filed Jan. 7, 2019, the disclosures of which are hereby incorporated by reference in their entirety.

BACKGROUND OF THE INVENTION

Field of the Invention

The present invention relates to bioretention systems for the temporary storage of runoff rainwater or storm water.

Description of Related Art

Bioretention systems were used to catch runoff rainwater or storm water. Heretofore, bioretention systems included a retaining wall forming an enclosure that included a water inlet to allow water to flow into the enclosure and a water outlet for water to flow out of the enclosure.

In one example, construction of a prior art bioretention system included pouring concrete into concrete form(s) that is/are assembled on-site in a desired configuration forming an enclosure; allowing the poured concrete to cure; removing the form(s); and then installing gravel and/or soil in and/or around the exterior of the enclosure formed by the cured concrete. In another example, a precast concrete bioretention system may be prepared for a specific site; transported on a truck to the site; and then installed. Gravel and/or soil can then be installed in and/or around the exterior of the enclosure formed by the precast concrete bioretention system.

Both of these prior art bioretention systems can be costly and difficult to implement, labor intensive to make and/or install, and, in the case of the precast concrete bioretention system, can require large equipment to install and is not easily modified once fabricated and/or installed.

SUMMARY OF THE INVENTION

Generally, provided, in some non-limiting embodiments or examples, is a modular, internally-braced, and self-supporting bioretention system that can be readily transported and assembled at a desired site or location. In some non-limiting embodiments or examples, the bioretention system can be used to drain, collect, and/or hold fluid (e.g., rainwater). However, this is not to be construed in a limiting sense.

In some non-limiting embodiments or examples, the system can have internal bracing and does not require permanent or temporary external bracing, e.g., concrete form(s), to function or be constructed. The internal bracing means that no soil reinforcement is necessary for the system to stand. In some non-limiting embodiments or examples, no additional support elements may be required outside of the footprint of the walls of the enclosure comprising the system, whereupon the walls or wall portions of the enclosure do not need temporary bracing to stand prior to backfilling, thereby simplifying installation.

In some non-limiting embodiments or examples, the height and/or width of each panel forming each wall portion of the enclosure and/or the number of said panels forming said wall portion can be selected as needed for site constraints. For example, each wall portion can include one panel, two panels, or more. For the purpose of description only, herein, wall portions may be described as having two panels, namely, an upper panel and a lower panel. However, this is not to be construed in a liming sense since it is envisioned that each wall portion may include only one panel or may include more than two panels.

In some non-limiting embodiments or examples, each wall portion of the enclosure can include a number of panels stacked vertically, edge-to-edge, allowing for optimization of the materials used form each tier or level of panels. In an example, lightweight and/or less expensive material(s) may be used for the lower or bottom panel which, in most instances, is below grade and not visible.

In some non-limiting embodiments or examples, the lower or bottom panel of a wall portion can be perforated or can include a drain pipe to allow for the passage through the lower or bottom panel of water from inside to outside of the enclosure while the upper panel can be solid. In an example, the top or upper panel can be fabricated to include a more visually appealing finishes and textures without having to do the same for the lower or bottom panel which may be designed to be installed below grade.

In some non-limiting embodiments or examples, each panel can be removed for maintenance or access to, for example, utilities. Individual panels of a wall portion can be replaced if damaged without disrupting other wall portions of the enclosure.

In some non-limiting embodiments or examples, the vertical arrangement of the lower and upper panels (and, if provided, any panels therebetween) of each wall portion facilitates waterproofing of the enclosure or portion thereof.

In some non-limiting embodiments or examples, the use of internal bracing enables the use of external connection elements to be avoided or eliminated. In an example, the use of interlocking or mating features between panels and supports, e.g., a raised part, ridge, or key interlocked or mated to a slot or groove, avoids the need for fasteners to hold the panels and supports of each wall portion together, and to hold together the wall portions forming the enclosure.

In some non-limiting embodiments or examples, the material(s) used to form each support, each panel, or both can be any suitable and/or desirable material. In an example, the material can include one or more of concrete, plastic, carbon fiber, and the like. However, this is not to be construed in a limiting sense since the use of any suitable and/or desirable material is envisioned.

Various preferred and non-limiting examples or aspects of the present invention will now be described and set forth in the following numbered clauses.

Clause 1: A bioretention system includes a plurality of connected wall portions defining an enclosure. Each wall portion comprises: a pair of supports positioned in spaced relation, each support having a body including a bottom and a top at opposite ends of the body; a lower panel (LP) positioned between the pair of the supports proximate the bottoms of the pair of supports, the LP including a LP top edge, a LP bottom edge, a LP first side edge extending between the LP top edge and the LP bottom edge, and a LP second side edge extending between the LP top edge and the LP bottom edge, wherein the LP first side edge and the body of a first one of the pair of supports include first LP complementary interlocking or mating features that are interlocked or mated to each other, and the LP second side edge and the body of a second one of the pair of supports include second LP complementary interlocking or mating features that are interlocked or mated to each other; and an upper panel (UP) positioned between the pair of the supports proximate the tops of the pair of supports, the UP including a UP top edge, a UP bottom edge, a UP first side edge extending between the UP top edge and the UP bottom edge, and a UP second side edge extending between the UP top edge and the UP bottom edge, wherein the LP top edge contacts the UP bottom edge, the UP first side edge and the body of the first one of the pair of supports include first UP complementary interlocking or mating features that are interlocked or mated to each other, and the UP second side edge and the body of the second one of the pair of supports include second UP complementary interlocking or mating features that are interlocked or mated to each other. The body can be elongated Clause 2: The system of clause 1 can further include an opening or aperture in a body of the UP of at least one wall portion between the UP first side edge and the UP second side edge.

Clause 3: The system of clause 1 or 2 can further include a trough or channel in fluid communication with the opening.

Clause 4: The system of any one of clauses 1-3 can further include a grate positioned over the trough or channel.

Clause 5: The system of any one of clauses 1-4, wherein at least a portion of the plurality of supports can each include a base that extends in a direction transverse from the body proximate the bottom of the body.

Clause 6: The system of any one of clauses 1-5 can further include means for linking the base of a first support to the base of a second support.

Clause 7: The system of any one of clauses 1-6, wherein the means for linking can include a bar or beam coupled to the bases of the first and second supports.

Clause 8: The system of any one of clauses 1-7, wherein each interlocking or mating features can include a raised part, ridge, or key mated or interlocked with a receiving slot or groove.

Clause 9: The system of any one of clauses 1-8, wherein at least one of the following can include the raised part, ridge, or key: the LP first side edge; the LP second side edge; the UP first side edge; and the UP second side edge.

Clause 10: The system of any one of clauses 1-9, wherein at least one of the following can include the receiving slot or groove: the first one of the pair of supports; and the second one of the pair of supports.

Clause 11: A method of forming a bioretention system comprises: (a) positioning on a surface a plurality of elongated supports, each support having a lower end positioned proximate the surface and an upper end spaced above the surface, in an array with a longitudinal axis of each support extending transverse to a plane of the surface; (b) positioning between each pair of adjacent or proximate supports, proximate the lower ends of the pair of adjacent or proximate supports, a lower panel; and (c) positioning between each pair of adjacent or proximate supports, proximate the upper ends of the pair of adjacent or proximate supports and atop of the lower panel, an upper panel, wherein: the combination of the supports, the lower panels, and the upper panels form or define an enclosure; and at least one upper panel includes an opening for the passage of fluid from an exterior of the enclosure to an interior of the enclosure.

Clause 12: The method of clause 11, wherein steps (b) and (c) can be performed in order or alternatingly.

Clause 13: The method of clause 11 or 12, wherein: step (b) can include coupling side edges of each lower panel to the pair of adjacent or proximate supports; and step (c) can include coupling side edges of each upper panel to the pair of adjacent or proximate supports.

Clause 14: The method of any one of clauses 11-13, wherein: step (b) can include coupling via complementary interlocking or mating features; and step (c) can include coupling via complementary interlocking or mating features.

Clause 15: The method of any one of clauses 11-14, wherein step (c) can include positioning a lower edge of the upper panel in contact an upper edge of the lower panel.

Clause 16: The method of any one of clauses 11-15 can further include coupling together lower ends of supports that are positioned not proximate or adjacent each other, i.e., positioned apart from each other, by at least one other support.

BRIEF DESCRIPTION OF THE DRAWINGS

These and other features of the present invention will become more apparent from the following description in which reference is made to the appended drawings wherein:

FIG. 6A is a perspective view of a third, bottom portion of the one non-limiting embodiment or example bioretention system of FIG. 2 in a partial state of assembly showing a means for linking, e.g., a bar, positioned for insertion into slots in bases of a first pair of supports positioned on opposite sides of the enclosure formed by the wall portions, said bases extending inwardly toward each other from the first pair of supports, and another means for linking (e.g., a bar) already inserted in the slots of bases of another pair of supports (in the background), wherein opposite ends of the other means for linking is coupled to the second pair of supports by fasteners;

FIG. 7 is a top view of a portion of another non-limiting embodiment or example bioretention system in accordance with the principles of the present invention including, in each wall portion, curved or arcuate shaped panels, that facilitate forming wall portions having curves or arcs versus the planar wall portions shown in FIGS. 1 and 2;

FIG. 9A-9B are top views of portions of other non-limiting embodiment or example bioretention systems in accordance with the principles of the present invention including supports of different shapes that facilitate forming the enclosure in one or more shapes other than the rectangular shape shown in FIGS. 1 and 2.

DESCRIPTION OF THE INVENTION

Figure 1:
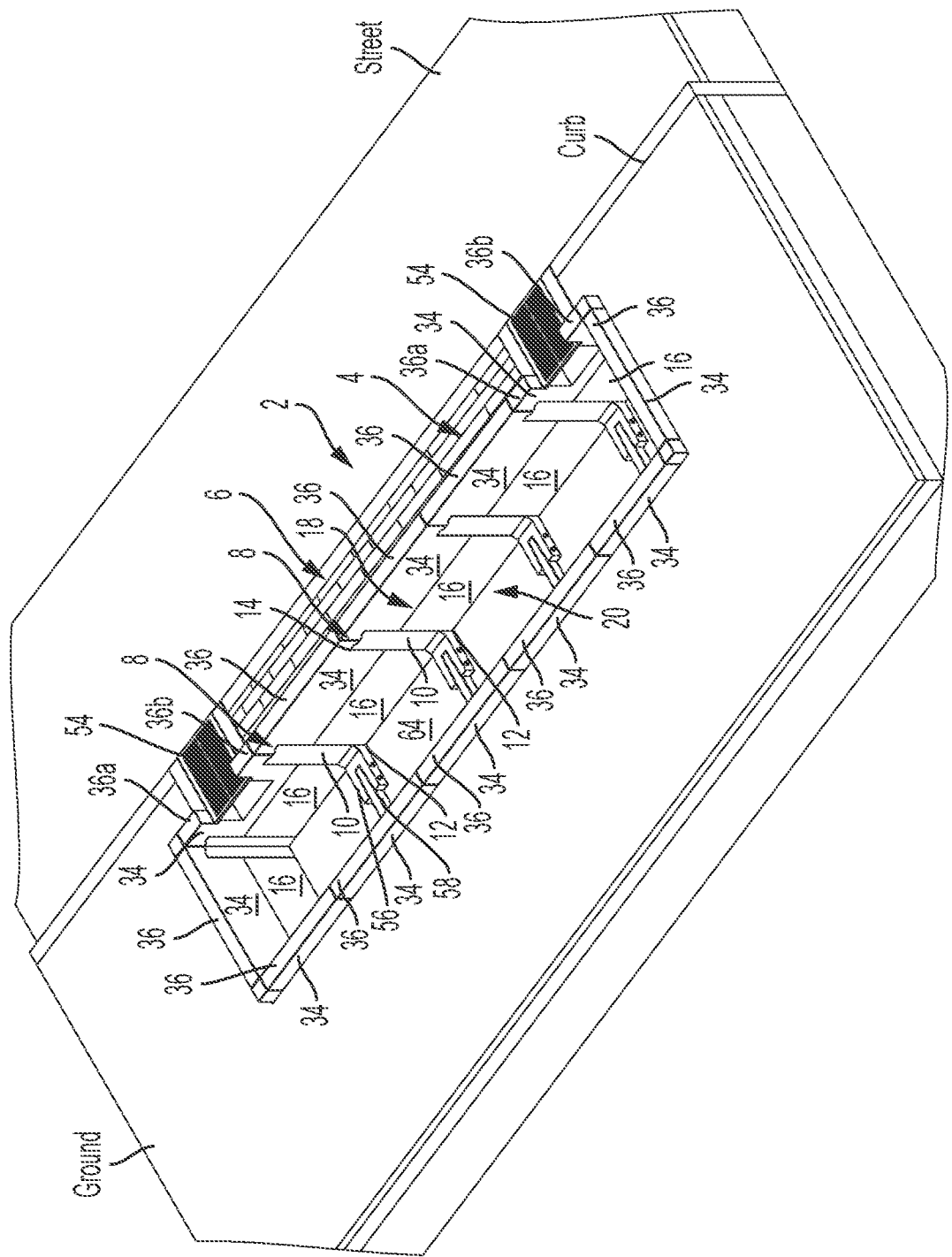
FIG. 1 is a perspective view of one non-limiting embodiment or example bioretention system, including a plurality of connected wall portions that define an enclosure, e.g., in one non-limiting embodiment or example, a rectangular enclosure, in accordance with the principles of the present invention installed in-ground proximate a street and a curb.

For the purposes of the following detailed description, it is to be understood that the invention may assume various alternative variations and step sequences, except where expressly specified to the contrary. It is also to be understood that the specific devices and methods described in the following specification are simply exemplary embodiments, examples, or aspects of the invention. Moreover, other than in any operating examples, or where otherwise indicated, all numbers expressing, in preferred and non-limiting embodiments, examples, or aspects, quantities of ingredients used in the specification and claims are to be understood as being modified in all instances by the term "about". Accordingly, unless indicated to the contrary, any numerical parameters set forth in the following specification and attached claims are approximations that may vary depending upon the desired properties to be obtained by the present invention. At the very least, and not as an attempt to limit the application of the Doctrine of Equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

It is also to be understood that the specific devices and processes illustrated in the attached drawings, and described in the following specification, are simply exemplary embodiments, examples, or aspects of the invention. Hence, specific dimensions and other physical characteristics related to the embodiments, examples, or aspects disclosed herein are not to be considered as limiting. Certain preferred and non-limiting embodiments, examples, or aspects of the present invention will be described with reference to the accompanying figures where like reference numbers correspond to like or functionally equivalent elements.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise.

For purposes of the description hereinafter, the terms "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the invention. Hence, the specific examples or aspects disclosed herein are not to be construed as limiting.

With reference to FIG. 1, in some non-limiting embodiments or examples, a bioretention system 2 can include a plurality of wall portions 4 connected together to form an enclosure 6. In some non-limiting embodiments or examples, bioretention system 2 can be installed in-ground proximate a street and a curb for capturing rainwater that runs off of the street into the enclosure 6 formed by wall portions 4 of bioretention system 2. However, this is not to be construed in a limiting sense since it is envisioned that bioretention system 2 may be used in other applications where retention of fluid, such as rainwater, is desired.

Figure 2:
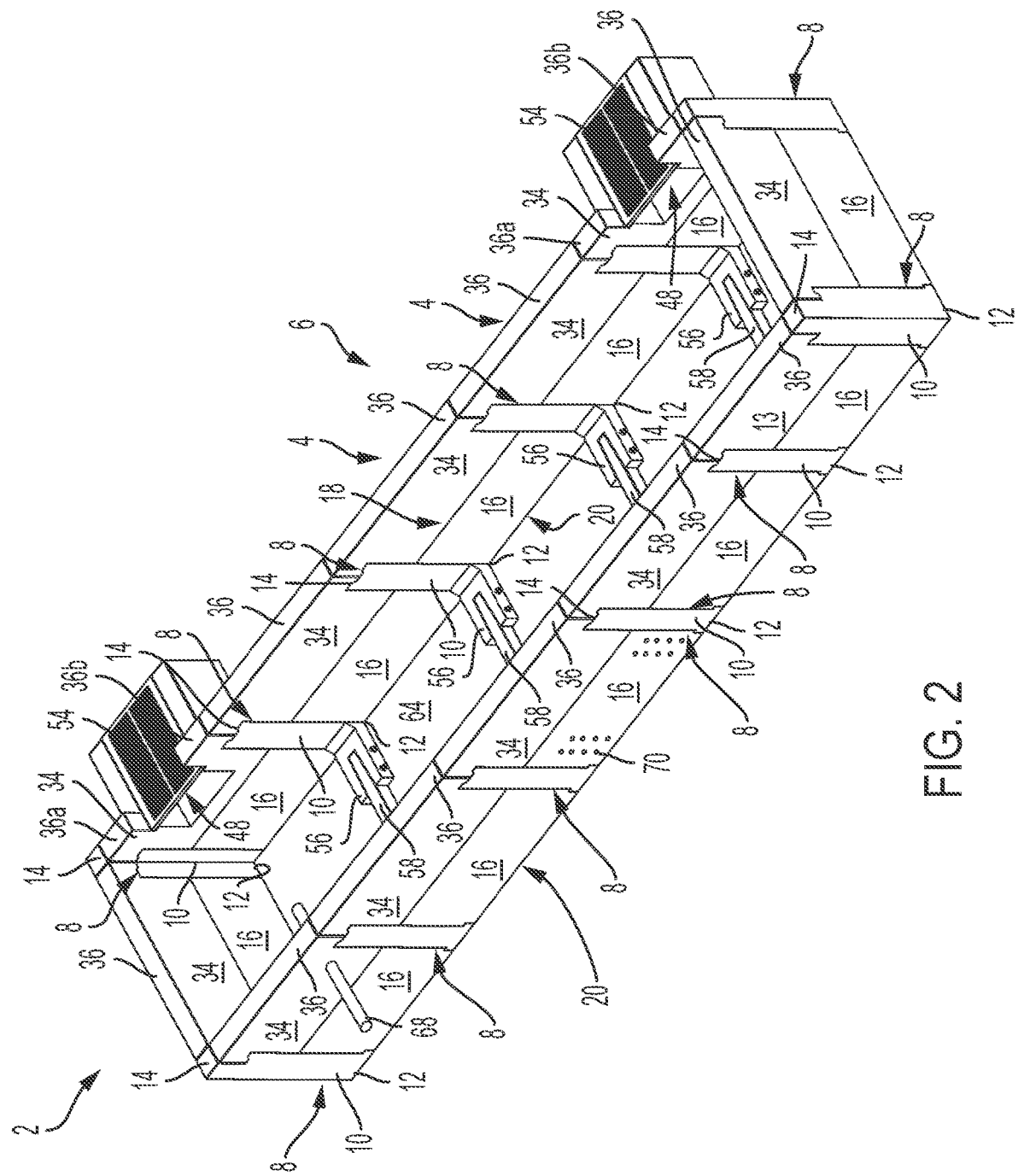
FIG. 2 is an isolated perspective view of the one non-limiting embodiment or example bioretention system of FIG. 1.

With reference to FIG. 2 and continuing reference to FIG. 1, in some non-limiting embodiments or examples, each wall portion 4 can be defined by a pair of supports 8 which may be adjacent or proximate each other and which can support one or more vertical panels, e.g., panels 16 and 34 described hereinafter. The description and illustrations herein of each wall portion 4 as being formed of a plurality of vertical panels is not to be construed in a limiting sense since it is envisioned that each wall portion 4 may be formed from only a single panel as may be deemed suitable and/or desirable by one skilled in the art for the application. The bioretention system 2 can be defined by a plurality of wall portions that are coupled together to form enclosure 6. In some non-limiting embodiments or examples, adjacent or proximate wall portions 4 can share a common support 8. Stated differently, a single support 8 can be shared by or part of a pair of adjacent or proximate wall portions 4. However, this is not to be construed in a limiting sense.

Figure 3:
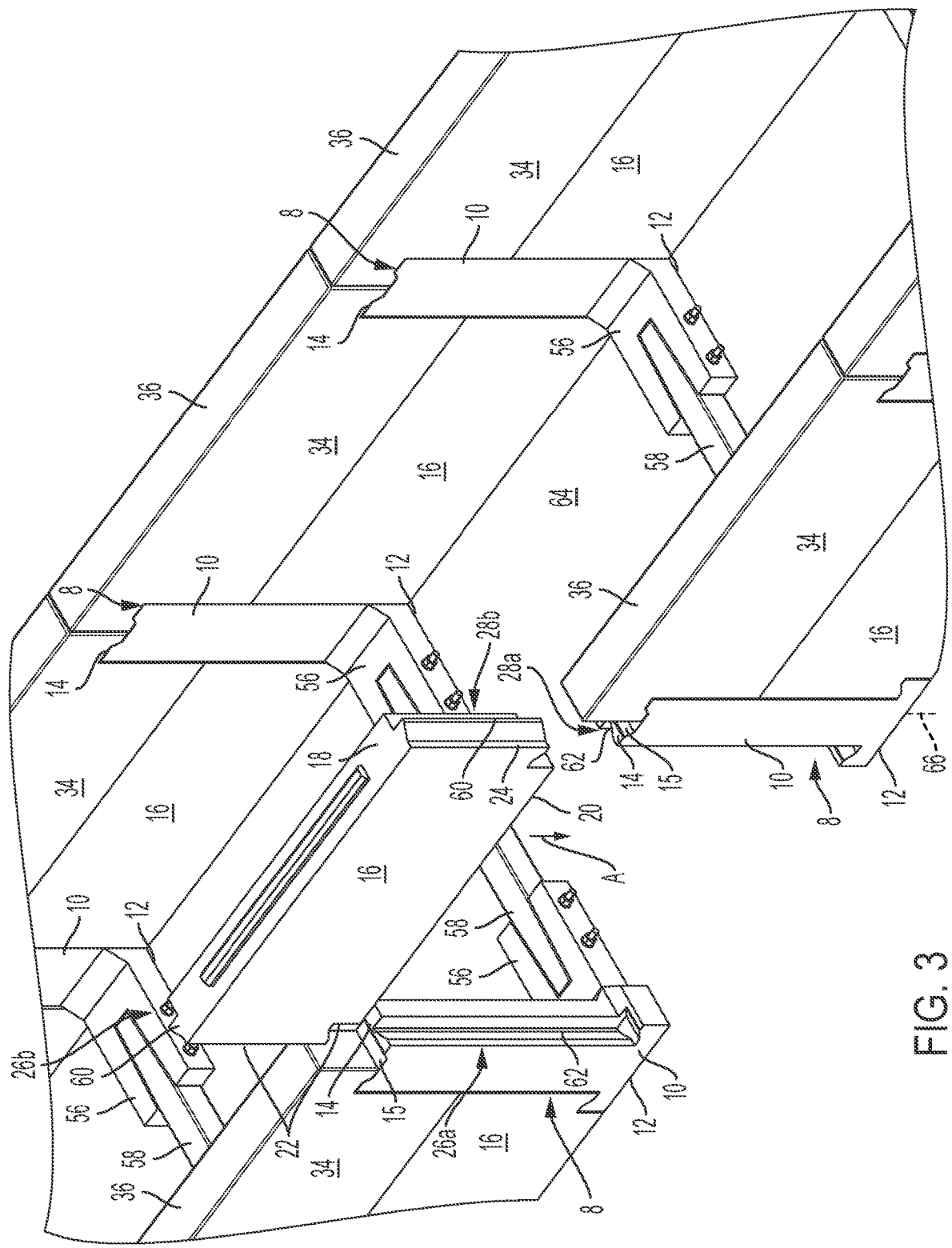
FIG. 3 is perspective view of a first portion of the one non-limiting embodiment or example bioretention system of FIG. 2 in a partial state of assembly showing a lower panel of a wall portion positioned for insertion between a pair of spaced supports.

With reference to FIG. 3 and with continuing reference to FIGS. 1 and 2, in some non-limiting embodiments or examples, each support 8 can include a body 10, e.g., an elongated body 10, including a bottom or lower end 12 and a top or upper end 14 at opposite ends of body 10. In some non-limiting embodiments or examples, between each pair of adjacent or proximate supports 8 can be positioned to support one or a plurality of vertically stacked panels to form a wall portion 4. In an example, the plurality of panels can include a lower panel (LP) 16 positioned between the pair of supports 8 proximate the bottom or lower ends 12 of said pair of supports 8. Herein, "lower panel" and "LP" may be used interchangeably. In an example, each lower panel 16 can include an LP top or upper edge 18, an LP bottom or lower edge 20, a first LP side (or edge) 22, and a second LP side (or edge) 24. However, a wall portion formed by a single panel between one or more pairs of adjacent or proximate supports 8 is envisioned.

In some non-limiting embodiments or examples, first LP side 22 of lower panel 16 can be coupled to a first support 8 via first complementary interlocking or mating features 26a (support 8) and 26b (first LP side 22). Similarly, second LP side 24 can be coupled to a second support 8 via second complementary interlocking or mating features 28a (support 8) and 28b (second LP side 24). In some non-limiting embodiments or examples, mating features 26a and 28a can have the same configuration and mating features 26b and 28b can have the same configuration. However, this is not to be construed in a limiting sense.

In some non-limiting embodiments or examples, the first complementary interlocking or mating features 26a, 26b can include a raised part, ridge, or key 60 on first LP side 22 and a receiving slot or groove 62 of the body 10 of the first support 8 to be mated or coupled to first LP side 22. Similarly, the second complementary interlocking or mating features 28a, 28b can include a raised part, ridge, or key 60 of second LP side 24 and a receiving slot or groove 62 of the body support 8 to be mated to or coupled to second LP side 24.

In some non-limiting embodiments or examples, the first and second complementary interlocking or mating features (26a, 26b) and (28a, 28b) can be configured to allow lower panel 16 to be slid in the direction of arrow A between the pair of supports 8 as shown in FIG. 3, whereupon the raised parts, ridges, or keys 60 of first and second LP sides 22 and 24 slidingly engage or are slidingly received in the complementary slots or grooves 62 of the adjacent or proximate supports 8.

Figure 4:
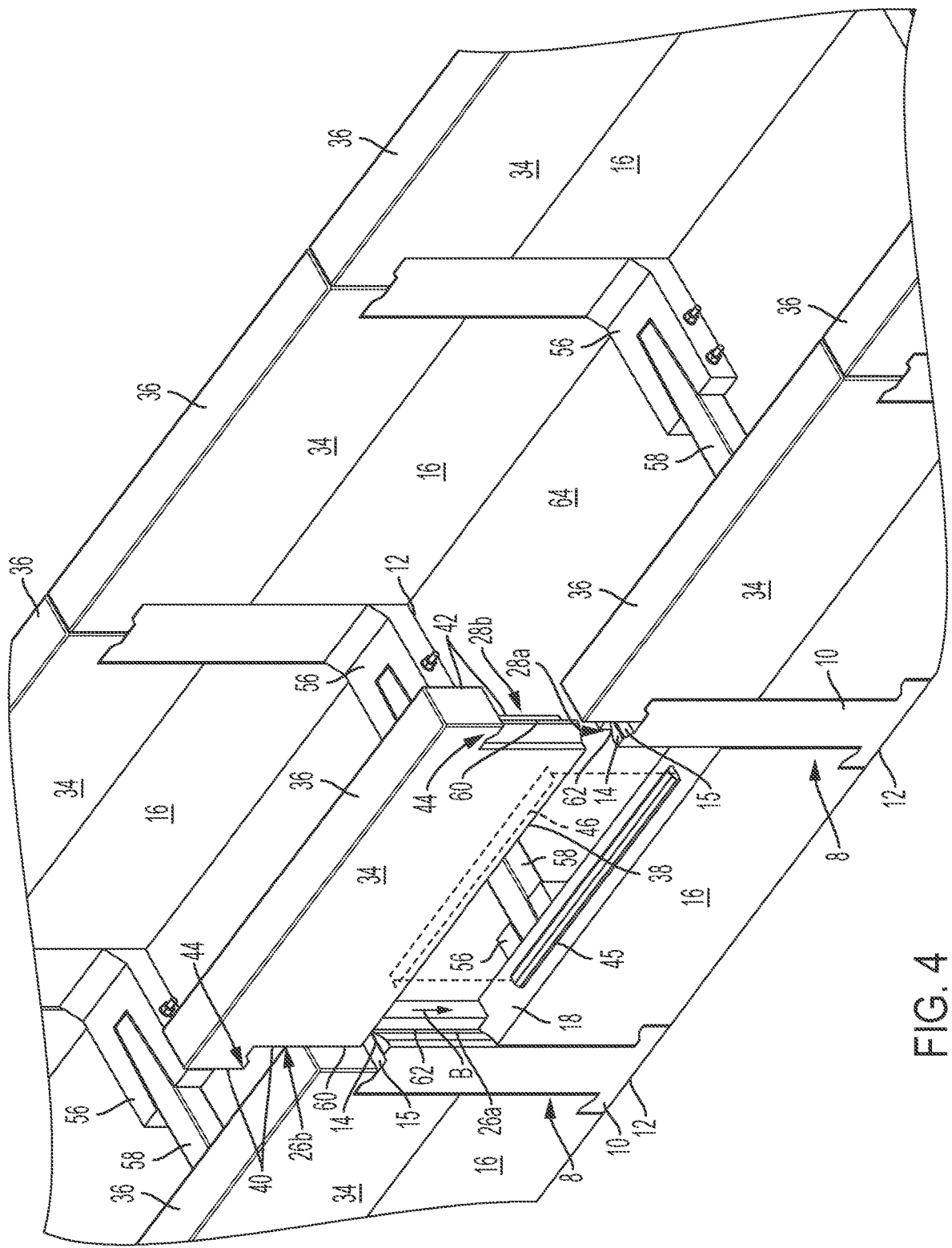
FIG. 4 is perspective view of the first portion of the one non-limiting embodiment or example bioretention system of FIG. 3 in a partial state of assembly showing an upper panel of the wall portion positioned for insertion between the pair of spaced supports over or above the lower panel installed between the pair of spaced supports.

With reference to FIG. 4 and continuing reference to FIG. 3, in some non-limiting embodiments or examples, once lower panel 16 is positioned between the bottoms or lower sides 12 of the pair of adjacent or proximate supports 8, an upper panel (UP) 34 can be positioned between said pair of adjacent or proximate supports 8 on top of lower panel 16. Herein, "upper panel" and "UP" may be used interchangeably. In some non-limiting embodiments or examples, each upper panel 34 can include an UP top or upper edge 36, an UP bottom or lower edge 38, a first UP side (or edge) 40, and a second UP side (or edge) 42. In some non-limiting embodiments or examples, first UP side 40 can be coupled to the first support 8 via first complementary interlocking features 26a (support 8) and 26b (first UP side 40). Similarly, second UP side 42 can be coupled to the second support via second complementary interlocking or mating features 28a (support 8) and 28b (second UP side 42). Proximate UP top edge 36 thereof upper panel 34 can have an optional T-shape with the distal end of each arm of said T-shape including a downward projection 44 configured to mate with a complementary mating slot or groove 15 on top or upper end 14 of the corresponding support 8. In some non-limiting embodiments or examples, each instance of first complementary interlocking features 26a and 26b and/or each instance of second complementary interlocking features 28a and 28b can have any suitable and/or desirable interlocking shape or configuration. According, the shapes or configurations of these complementary interlocking features shown in the attached figures is not to be construed in a limiting sense.

In some non-limiting embodiments or examples, each upper panel 34 can be positioned on top of a lower panel 16 between the pair of adjacent or proximate supports 8 by moving said upper panel 34 in the direction of arrow B shown in FIG. 4, whereupon the raised parts, ridges, or keys 60 of first and second UP sides 40 and 42 slidingly engage or are slidingly received in the first complementary slots or grooves 62 of the adjacent proximate supports 8 until UP bottom edge 38 contacts LP top edge 18 as shown, for example, in FIG. 2.

In some non-limiting embodiments or examples, some or all LP top edges 18 can include a longitudinal ridge 45 that extends between first and second LP sides 22 and 24 and some or all UP bottom edges 38 can include a complementary receiving channel or slot 46 (shown in phantom in FIG. 4) that extends between first and second UP sides 40 and 42. When LP top edge 18 of lower panel 16 and UP bottom edge 38 of upper panel 34 are positioned in contact with each other, ridge 45 can be received in channel 46 as an aid to aligning upper panel 34 and lower panel 16 vertically.

In some non-limiting embodiments or examples, it is envisioned that a single panel can be used instead of lower panel 16 and upper panel 34 of one or more wall portions 4. In an example, said single panel can perform and be similar to the combination of lower panel 16 and upper panel 34. However, this is not to be construed in a limiting sense.

Figure 5A:
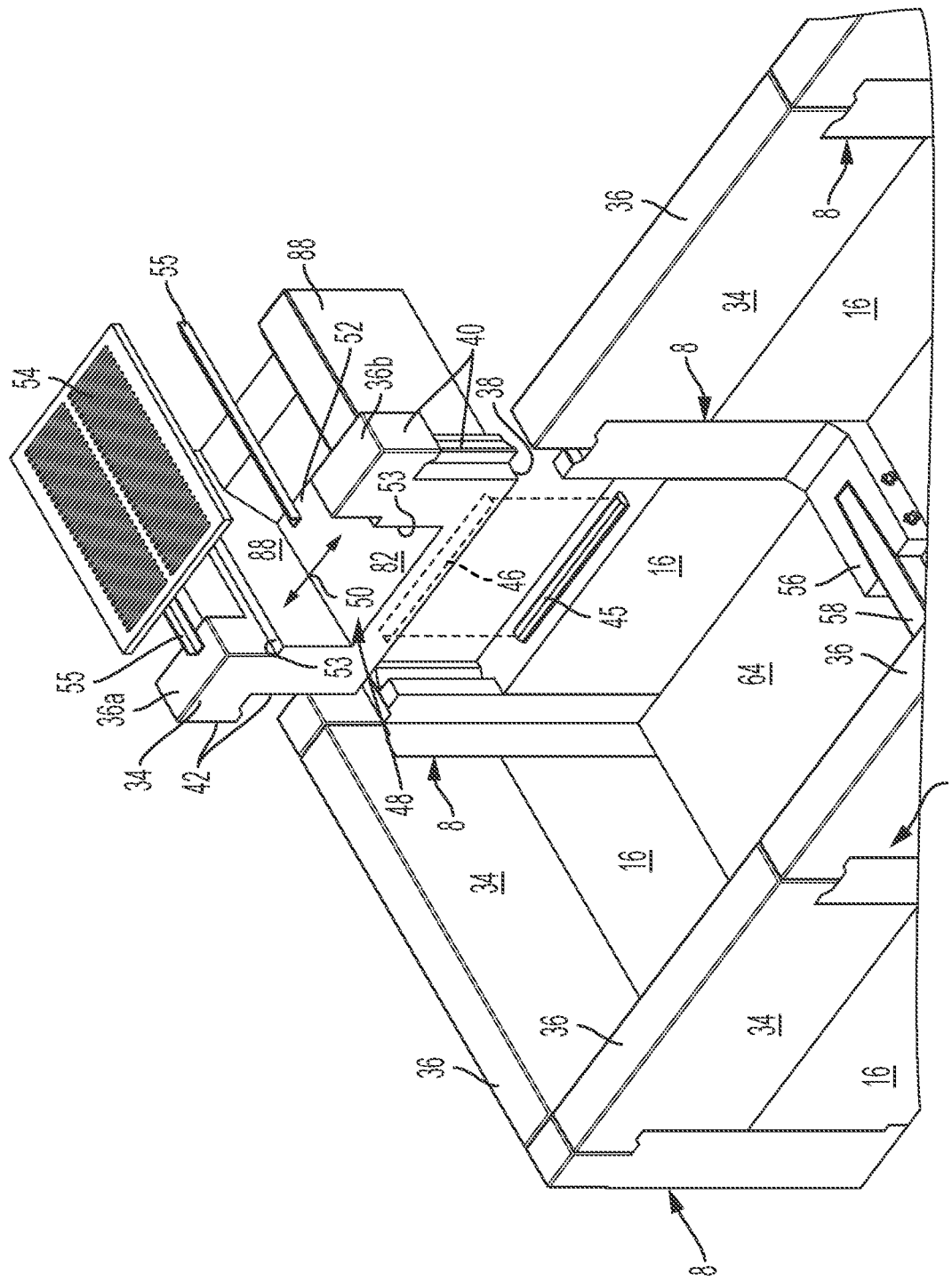
FIG. 5A is a perspective view of a second portion of the one non-limiting embodiment or example bioretention system of FIG. 2 in a partial state of assembly showing an upper panel of a wall portion positioned for insertion between a pair of spaced supports over or above a lower panel that is already installed between the pair of spaced supports, wherein the upper panel includes an opening in fluid communication with trough or channel that can feed fluid from an exterior to an interior of the enclosure formed by the plurality of connected wall portions.

With reference to FIG. 5A and with continuing reference to FIGS. 1-4, in some non-limiting embodiments or examples, one or more upper panels 34 of wall portions 4 of enclosure 6 can include an opening or aperture 48 configured to permit fluid to enter the interior of enclosure 6 from an exterior of enclosure 6. In one example shown in FIG. 5A, opening 48 can be defined by a space or gap 50 between first and second UP side edges 40 and 42, UP bottom or lower edge 38, and spaced UP top or upper edges 36a and 36b. In some non-limiting embodiments or examples shown in FIG. 5B, opening 48 can be defined by a space or gap 50 between first and second UP side edges 40 and 42, UP bottom or lower edges 38a-38c, and top or upper edge 36.

In some non-limiting embodiments or examples, a trough or channel 52 can be in fluid communication with opening or aperture 48. Trough or channel 52 can be configured to direct or channel fluid through opening or aperture 48 into the interior of enclosure 6 from a desired area where fluid would otherwise accumulate, e.g., direct rainwater accumulating on a street into the interior enclosure 6. The shapes of opening or aperture 48, space or gap 50, and/or trough or channel 52 shown in FIG. 5 is/are not to be construed in a limiting sense since each of these may have any shape or configuration deemed suitable and/or desirable for a particular application. For example, space 50 between UP top or upper edges 36a and 36b (in FIG. 5A) may not be provided (e.g., UP top or upper edge 36 may be continuous), and/or opening or aperture 48 and trough or channel 52 may have the form of a hollow tube or cylinder. Accordingly, the particular configuration of opening or aperture 48 and trough or channel 52 is not to be construed in a limiting sense.

Figure 5B:
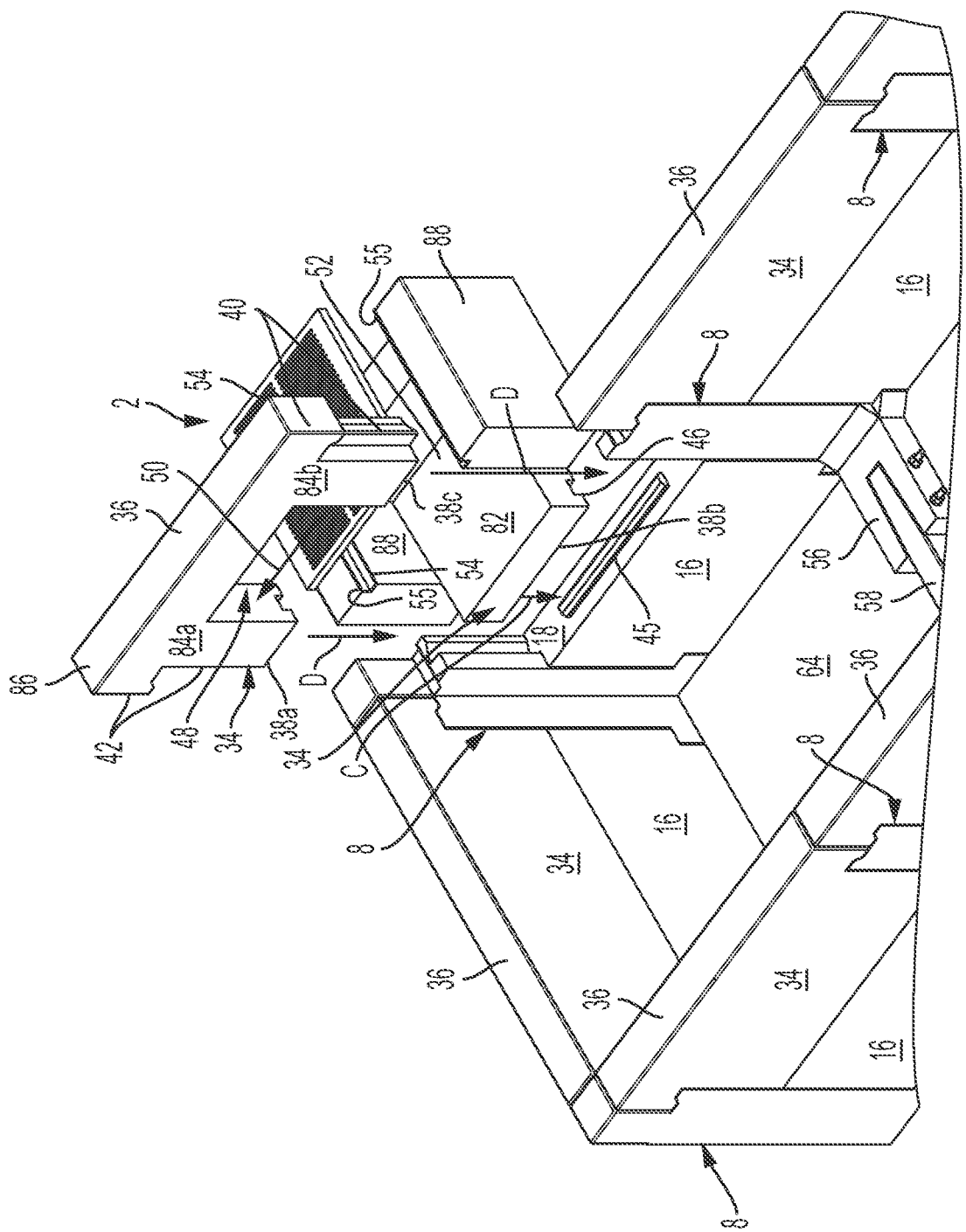
FIG. 5B is a perspective view of a second portion of the one non-limiting embodiment or example bioretention system shown in FIG. 2 in a partial state of assembly showing a different or alternate configuration of an upper panel of the wall portion positioned for insertion between the pair of spaced supports over or above the lower panel that is already installed between the pair of spaced supports, wherein the upper panel includes an opening in fluid communication with a separate component that can be nested within the opening of or otherwise mated with the upper panel featuring trough or channel that can feed fluid from an exterior to an interior of the enclosure formed by the plurality of connected wall portions.

In some non-limiting embodiments or examples, trough or channel 52 may be an integral part of upper panel 34 as shown in FIG. 5A or, alternatively, may be coupled to, made part of, or positioned or joined in cooperative relation with the elements of upper panel 34 defining UP top or upper edge 36, UP bottom or lower edges 38a-38c, first UP side edge 40, and second UP side edge 42 as shown in FIG. 5B. The particular manner in which optional trough or channel 52 is coupled to, made part of, or positioned or joined in cooperative relation with upper panel 34 is not to be construed in a limiting sense.

In some non-limiting embodiments or examples shown in FIG. 5B, upper panel 34 can be defined by an inverted U-shaped portion 86 and a portion of base 82 of trough or channel 52. In an example, the portion of base 82 of trough or channel 52 may include on a bottom surface thereof an instance of the receiving channel or slot 46 that can receive or mate with an instance of an optional ridge 45 on the LP top or upper edge 18 of the lower panel 16 that defines with said upper panel 34 the wall portion 2 that includes the trough or channel 52. In an example, UP bottom or lower edge 38b can be defined by the bottom of said portion of base 82 of trough or channel 52 and bottom or lower portions 38a and 38c can be defined by the bottom or lower ends of spaced downwardly extending legs 84a and 84b, respectively, of inverted U-shaped portion 86.

In some non-limiting embodiments or examples, the bottom surface of the portion of base 82 can be positioned on the LP top or upper edge 18 of the lower panel 16 by moving base 82 in the direction of arrow C in FIG. 5B and the bottom or lower ends of spaced downwardly extending legs 84a and 84b of inverted U-shaped portion 86 can be positioned on the LP top or upper edge 18 of the lower panel 16 on opposite sides of said portion of base 82 by moving legs 84a and 84b in the direction of arrows D in FIG. 5B. The order of moving legs 84a and 84b in the direction of arrows D and moving base 82 in the direction of arrow C is not to be construed in a limiting sense.

In some non-limiting embodiments or examples, the combination of trough or channel 52, defined by base 82, a pair of spaced sidewalls 88, and U-shaped portion 86 can be designed or configured to be fluid tight or substantially fluid tight. However, this is not to be construed in a limiting sense.

In some non-limiting embodiments or examples, each instance of trough or channel 52 many include a pair of spaced L-shaped steps 53 on spaced sidewalls 88 that extend transverse or parallel to a surface of base 82 of trough or channel 52. L-shaped steps 53 can be configured to support opposite sides of a grate 54, either directly or via a pair of L-brackets 55.

In an example, as can be understood from FIG. 1, trough or channel 52, including grate 54 thereover can operate in a manner known in the art to allow fluid (e.g., rainwater) to enter through grate 54, trough or channel 52, and opening or aperture 48 into the interior of enclosure 6 from, for example, a street. However, this is not to be construed in a liming sense.

Figure 6B:
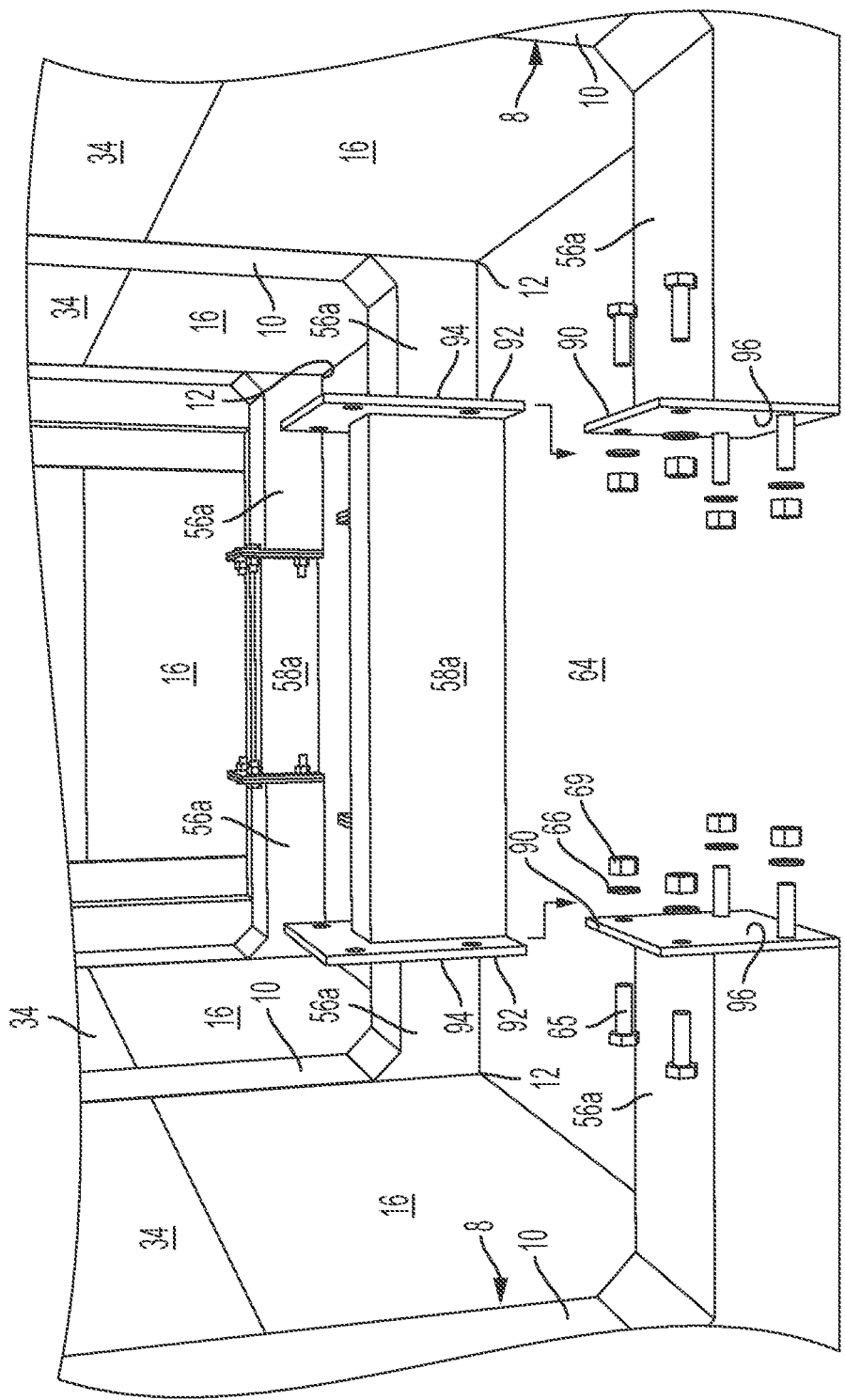
FIG. 6B is a perspective view of the third, bottom portion of the one non-limiting embodiment or example bioretention system shown in FIG. 2 in a partial state of assembly showing a different or alternate means for linking, e.g., a bar or beam including outward surfaces on opposite ends thereof, positioned for insertion between opposing surfaces on distal ends of bases of a first pair of supports positioned on opposite sides of the enclosure formed by the wall portions, said bases extending inwardly toward each other from the first pair of supports, and another means for linking (e.g., a bar or beams) already inserted between distal ends of bases of a second pair of supports (in the background), wherein the outward surfaces on the opposite ends of the different or alternate means linking are coupled to the opposing surfaces of another pair of supports by fasteners.

With reference to FIGS. 6A-6B and with continuing reference to all previous figures, in some non-limiting embodiments or examples, some or all of supports 8 of enclosure 6 may include an optional base 56. However, this is not to be construed in a limiting sense since it is envisioned that enclosure 6 may be formed of one or more supports 8 that do not include a base 56. One non-limiting example of where supports 8 of enclosure 6 may not include base 56 include corners of enclosure 8. However, this is not to be construed in a limiting sense.

In some non-limiting embodiments or examples, each provided base 56 can be formed as part of a corresponding support 8 or coupled to said support 8. In an example, each base 56 and its corresponding support 8 can be formed as a unified or integral piece. However, this is not to be construed in a limiting sense since it is envisioned that each base 56 may be coupled to a corresponding support 8 in any suitable and/or desirable manner, e.g., via suitable fasteners (not shown) and/or suitable interlocking or mating means (not shown). In an example, each base 56 can extend transverse, e.g., perpendicular, from the bottom or lower end 12 of a corresponding support 8 into the interior of enclosure 6, transverse, e.g., perpendicular, to the inwardly facing face of at least one of the panels, e.g., a lower panel 16, supported by said support 8.

In some non-limiting embodiments or examples shown in FIG. 6A, each base 56 can include on a distal end thereof a slot 57 that opens to the interior of enclosure 6. A means for linking 58 can be coupled between slots 57 on opposite sides or on substantially opposite sides of enclosure 6 for fixing the distance between the bottom or lower ends 12 of the corresponding supports 8. In an example, the means for linking 58 can be a bar, the ends of which bar can be received or positioned in slots 57 on opposite sides or on substantially opposite sides of enclosure 6 and secured thereto by interlocking or mating features (not shown) and/or by suitable fasteners or fastening means 59. In some non-limiting embodiments or examples, fastening means 59 may include clevis pins inserted through openings or holes in the ends of the means for linking (bar) 58 and openings or holes on either side of slots 57 of bases 56. Each clevis pin may be secured in place via a washer 66 and a cotter pin 67 in a manner known in the art. However, the particular means by which means for linking (bar) 58 is secured in slots 57 of bases 56 is not to be construed in a limiting sense. For example, each end of means for linking (bar) 58 and a slot 57 may include complementary interlocking or mating features that enable said end and slot to be coupled together.

In another non-limiting embodiment or example shown in FIG. 6B, each base 56a can include on a distal end thereof a surface 96 that can be defined by a plate 90—versus the slot 57 shown in FIG. 6A. A means for linking 58a can be coupled between surfaces 96 on opposite sides or on substantially opposite sides of enclosure 6 for fixing the distance between the bottom or lower ends 12 of the corresponding supports 8. In this example, the means for linking 58a can be a bar or beam, the ends of which can include outwardly facing surfaces 94, that can be defined by plates 92, configured to contact surfaces 96 on opposite sides or on substantially opposite sides of enclosure 6 when the bar or beam is positioned therebetween. Suitable fasteners or fastening means, such as, for example, nuts 69, bolts 65, and washers 66, can be used to secure surfaces 94 and surfaces 96 together via openings in plates 90 and 92 in a manner known in the art and, thereby, secure the bar or beam between bases 56a on opposite sides of the interior of enclosure 6. However, the particular means by which means for linking (bar or beam) 58a is secured between bases 56 is not to be construed in a limiting sense. For example, each end of means for linking (bar or beam) 58a and the distal end of the base 56a may include complementary interlocking or mating features that enable said ends to be coupled together.

The examples of means for linking described above, including bar or beam 58a including surfaces 94 and each base 56a including a surface 96, or bar 58 having ends received in receiving slots 57 of bases 56 is/are not to be construed in a limiting sense since it is envisioned that any other suitable and/or desirable means for linking can be used to couple together the bottom or lower ends 12 of supports 8 on opposite or on substantially opposite sides of enclosure 6.

In some non-limiting embodiments or examples, as can be understood from FIG. 1, the bottom side of each base 56 and, optionally, each LP bottom or lower edge 20 can rest on a surface 64. In an example, surface 64 can be exposed by the excavation of the ground in which enclosure 6 is installed and/or received. However, this is not to be construed in a limiting sense.

Referring back to FIG. 2, in some non-limiting embodiments or examples, enclosure 6 may include means for fluid to exit the interior or enclosure 6 other than via the opening or aperture 48 of one or more upper panels 34. In an example, said means can include an overflow pipe or tube 68 in one or more panels, perforations or holes 70 in one or more panels, or both. The illustration of FIG. 2 of overflow pipe 68 projecting through an upper panel 34 is not to be construed in a limiting sense since it is envisioned that overflow pipe can be included in a lower panel 16. Moreover, a number of overflow pipes 68 can be provided in one or more panels, e.g., each overflow pipe may be positioned in a lower panel 16 or an upper panel 34. Similarly, the illustration of perforations or holes 70 in lower panel 16 is not to be construed in a limiting sense since it is envisioned that perforations or holes can also or alternatively be included in an upper panel 34. Moreover, perforations or holes may be provided in a number of lower panels 16, upper panels 34, or some combination thereof. Accordingly, the illustration in FIG. 2 of a single pipe 68 in an upper panel 34 and perforations or holes 70 in a lower panel 16 is not to be construed in a limiting sense. Moreover, the use of an overflow pipe may be to the exclusion of perforations or holes, and vice versa. However, the use of an overflow pipe in combination with perforations or holes is also envisioned.

The illustration in FIG. 2 of enclosure 6 having a rectangular shape, and upper and lower panels each having a planar shape is not to be construed in a limiting sense. To this end, as shown in the top-down view of FIG. 7, one or more wall portions 4 of enclosure 6 may be formed of one or more panels, e.g., lower and upper panels 16 and 34, having an arcuate or curved shape. In FIG. 7, LP top edges 18 of lower panels 16 beneath upper panels 34 are shown for the purpose of illustration and is not to be construed in a limiting sense. FIG. 7 also illustrates, in phantom lines, raise parts, ridges, or keys 60 and slots or grooves 62 of at least upper panels 34 and supports 8.

Figure 8:
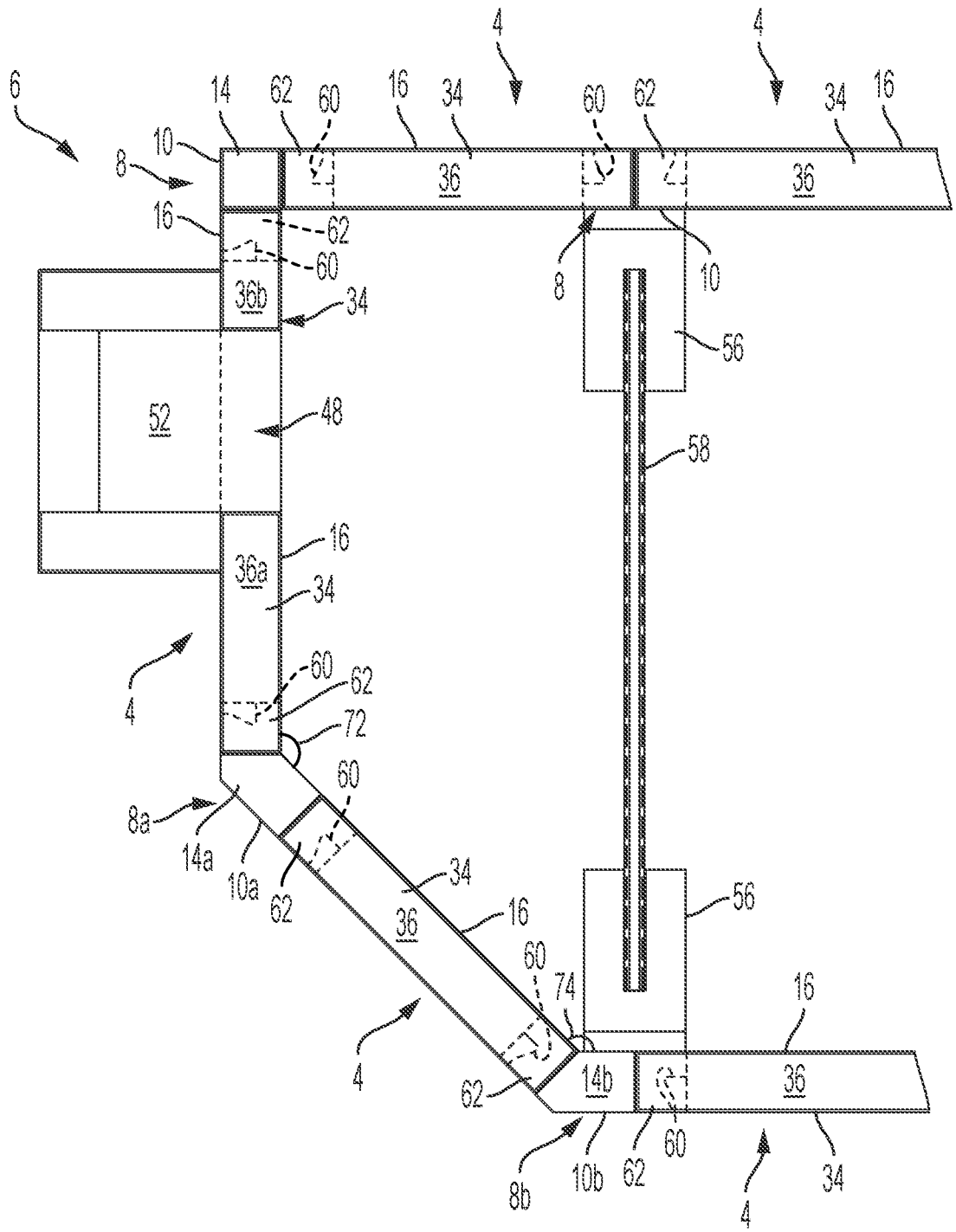
FIG. 8 is a top view of a portion of another non-limiting embodiment or example bioretention system in accordance with the principles of the present invention including supports of different shapes that facilitate forming the enclosure in one or more shapes other than the rectangular shape shown in FIGS. 1 and 2.

With reference to FIG. 8 and with continuing reference to FIGS. 2 and 7, in some non-limiting embodiments or examples, also or alternatively to one or more panels, e.g., lower and upper panels 16 and 34, being planar (FIG. 2) or having an arcuate or curved shape (FIG. 7), one or more supports 8 can be configured to support the lower and upper panels 16 and 34 of proximate or adjacent wall portions 4 at an angle other than 90° (the corner supports 8 in FIG. 2) or at an angle other than 180° (the supports 8 including bases 56 in FIG. 2). In an example shown in FIG. 8, enclosure 6 may include a support 8a having a body 10a and a top or upper end 14a. Support 8a can be configured with an obtuse interior angle 72, whereupon panels positioned on opposite sides of support 8a are held at an obtuse angle to each other. Similarly, enclosure 6 may include a support 8b having an obtuse interior angle 74, whereupon panels positioned on opposite sides of support 8b are held at obtuse angle 74 to each other.

FIG. 8 illustrates a portion of enclosure 6 having planar lower panels 16 beneath planar upper panels 34, with one upper panel 34 including trough or channel 52. However, this is not be construed in a limiting sense since it is envisioned that panels of at least one wall portion 4 may have an arcuate or curved shape (FIG. 7) and the corresponding pair of supports 8 of said wall portion 4 can be suitably configured to support the curved or arcuate shaped panel(s). To this end, it is envisioned that each wall portion 4, especially the panel(s) forming said wall portion 4, of enclosure 8 can have any suitable and/or desirable shape, including planar, arcuate, or some other shape as may be deemed suitable and/or desirable for a particular application. Accordingly, the illustration in FIGS. 7 and 8 of lower and upper panels 16 and 34 of each wall portion 4 having a particular shape, e.g., planar, curved, arcuate, or another shape, is not to be construed in a limiting sense.

Referring to FIG. 9A and with continuing reference to FIG. 8, in some non-limiting embodiments or examples, enclosure 6 may include a support 8c having a body 10c including a top or upper end 14c. Support 8c can be formed or configured to have an acute interior angle 76. Referring to FIG. 9B and with continuing reference to FIGS. 8 and 9A, in another example, enclosure 6 may include a support 8d having a body 10d including a top or upper end 14d. Support 8d can be formed or configured to have an obtuse exterior angle 78, whereupon the upper and lower panels 16 and 34 of adjacent or proximate wall portions 4 form a reflex interior angle 80 (i.e., 180°≤angle 80≤360°).

In some non-limiting embodiments or examples, as can be understood from at least FIGS. 7-9B, enclosure 6 can be formed in shapes other than square or rectangular. Accordingly, the illustration in FIGS. 1 and 2 of enclosure 8 having a rectangular shape is not be construed in a liming sense.

As can be seen, disclosed herein is a bioretention system 2 that include a plurality of connected wall portions 4 defining an enclosure 6, each wall portion 4 comprising: a pair of supports 8 positioned in spaced relation, each support having a body 10 including a bottom 12 and a top 14 at opposite ends of the body; a lower panel 16 (LP) positioned between the pair of the supports 12 proximate the bottoms 12 of the pair of supports, the LP including a LP top edge 18, a LP bottom edge 20, a LP first side edge 22 extending between the LP top edge 18 and the LP bottom edge 20, and a LP second side edge 24 extending between the LP top edge 18 and the LP bottom edge 20, wherein the LP first side edge 22 and the body 10 of a first one of the pair of supports 8 include first LP complementary interlocking or mating features 26a, 26b that are interlocked or mated to each other, and the LP second side edge 24 and the body 10 of a second one of the pair of supports 12 include second LP complementary interlocking or mating features 28a, 28b that are interlocked or mated to each other; and an upper panel (UP) 34 positioned between the pair of the supports 12 proximate the tops 14 of the pair of supports, the UP including a UP top edge 36, a UP bottom edge 38, a UP first side edge 40 extending between the UP top edge 36 and the UP bottom edge 38, and a UP second side edge 42 extending between the UP top edge 36 and the UP bottom edge 38, wherein the LP top edge 18 contacts the UP bottom edge 38, the UP first side edge 40 and the body 10 of the first one of the pair of supports 8 include first UP complementary interlocking or mating features 26a, 26b that are interlocked or mated to each other, and the UP second side edge 42 and the body 10 of the second one of the pair of supports 8 include second UP complementary interlocking or mating features 28a, 28b that are interlocked or mated to each other.

The system can further include an opening or aperture 48 in a body 50 of the UP 34 of at least one wall portion 4 between the UP first side edge 40 and the UP second side edge 42.

The system can further include a trough or channel 52 in fluid communication with the opening 48. A grate 54 can be positioned over the trough or channel 52.

At least a portion of the plurality of supports 8 can each include a base 56 that extends in a direction transverse from the body 10 proximate the bottom 12 of the body 10.

Means for linking 58 can be provided for linking the base of a first support to the base of a second support. In an example, the means for linking 58 can include at least one bar coupled to the bases 26 of the first and second supports 8.

Each interlocking or mating features can include a raised part, ridge, or key 60 mated or interlocked with a receiving slot or groove 62. At least one of the following can include the raised part, ridge, or key: the LP first side edge 22; the LP second side edge 24; the UP first side edge 40; and the UP second side edge 42. At least one of the following can includes the receiving slot or groove: the first one of the pair of supports 8; and the second one of the pair of supports 8.

Also disclosed herein is a method of forming a bioretention system comprising: (a) positioning on a surface 64 a plurality of elongated supports 8, each support 8 having a lower end 12 positioned proximate the surface 64 and an upper end 14 spaced above the surface 64, in an array with a longitudinal axis of each support 8 extending transverse to a plane of the surface 64; (b) positioning between each pair of adjacent or proximate supports 8, proximate the lower ends 12 of the pair of adjacent or proximate supports, a lower panel 16; and (c) positioning between each pair of adjacent or proximate supports 8, proximate the upper ends 14 of the pair of adjacent or proximate supports and atop of the lower panel 16, an upper panel 34, wherein: the combination of the supports 8, the lower panels 16, and the upper panels 34 form or define an enclosure 6; and at least one upper panel 34 includes an opening 48 for the passage of fluid from an exterior of the enclosure 6 to an interior of the enclosure 6.

Step (b) can include coupling side edges 22, 24 of each lower panel 16 to the pair of adjacent or proximate supports 8. Step (c) can includes coupling side edges 40, 42 of each upper panel 34 to the pair of adjacent or proximate supports 8.

Step (b) can include coupling via complementary interlocking or mating features 26a, 26b and 28a, 28. Step (c) can includes coupling via complementary interlocking or mating features 44a, 44b and 46a, 46b.

Step (c) can include positioning a lower edge 38 of the upper panel 34 in contact an upper edge 18 of the lower panel 16.

The method can further include coupling together lower ends 12 of supports 8 that are positioned apart from each other by a means for linking 58, 58a.

Although the invention has been described in detail for the purpose of illustration based on what is currently considered to be the most practical preferred and non-limiting embodiments, examples, or aspects, it is to be understood that such detail is solely for that purpose and that the invention is not limited to the disclosed preferred and non-limiting embodiments, examples, or aspects, but, on the contrary, is intended to cover modifications and equivalent arrangements that are within the spirit and scope of the appended claims. For example, it is to be understood that the present invention contemplates that, to the extent possible, one or more features of any preferred and non-limiting embodiment, example, or aspect can be combined with one or more features of any other preferred and non-limiting embodiment, example, or aspect.

The invention claimed is:

1. A bioretention system including a plurality of connected wall portions defining an enclosure, each wall portion comprising:
   a pair of supports positioned in spaced relation, each support having a body including a bottom and a top at opposite ends of the body;
   a lower panel (LP) positioned between the pair of the supports proximate the bottoms of the pair of supports, the LP including a LP top edge, a LP bottom edge, a LP first side edge extending between the LP top edge and the LP bottom edge, and a LP second side edge extending between the LP top edge and the LP bottom edge, wherein the LP first side edge and the body of a first one of the pair of supports include first LP complementary interlocking and mating features that are interlocked and mated to each other, and the LP second side edge and the body of a second one of the pair of supports include second LP complementary interlocking and mating features that are interlocked and mated to each other; and
   an upper panel (UP) positioned between the pair of the supports proximate the tops of the pair of supports, the UP including a UP top edge, a UP bottom edge, a UP first side edge extending between the UP top edge and the UP bottom edge, and a UP second side edge extending between the UP top edge and the UP bottom edge, wherein the LP top edge contacts the UP bottom edge, the UP first side edge and the body of the first one of the pair of supports include first UP complementary interlocking and mating features that are interlocked and mated to each other, and the UP second side edge and the body of the second one of the pair of supports include second UP complementary interlocking and mating features that are interlocked and mated to each other,
   wherein each interlocked and mated complementary interlocking and mating feature includes the side edge of the panel in contact with or engaged with the body of the support.

2. The system of claim 1, further including an opening or aperture in a body of the UP of at least one wall portion between the UP first side edge and the UP second side edge.

3. The system of claim 2, further including a trough or channel in fluid communication with the opening.

4. The system of claim 3, further including a grate positioned over the trough or channel.

5. The system of claim 1, wherein at least a portion of the plurality of supports each includes a base that extends in a direction transverse from the body proximate the bottom of the body.

6. The system of claim 5, further including means for linking the base of a first support to the base of a second support.

7. The system of claim 6, wherein the means for linking includes a bar or beam coupled to the bases of the first and second supports.

8. The system of claim 1, wherein each interlocking and mating features includes a raised part, ridge, or key interlocked and mated with a receiving slot or groove.

9. The system of claim 8, wherein at least one of the following includes the raised part, ridge, or key:
the LP first side edge;
the LP second side edge;
the UP first side edge; and
the UP second side edge.

10. The system of claim 8, wherein at least one of the following includes the receiving slot or groove:
the first one of the pair of supports; and
the second one of the pair of supports.

11. The system of claim 1, further including the side edge of the panel and the body of the support include surfaces that contact or engage at an angle transverse to a direction that extends directly from the side edge of the panel to the body of the support.

12. A method of forming a bioretention system comprising:
(a) positioning on a surface a plurality of elongated supports, each support having a lower end positioned proximate the surface and an upper end spaced above the surface, in an array with a longitudinal axis of each support extending transverse to a plane of the surface;
(b) positioning between each pair of adjacent or proximate supports, proximate the lower ends of the pair of adjacent or proximate supports, a lower panel and coupling side edges of each lower panel to the pair of adjacent or proximate supports via complementary interlocking and mating features; and
(c) positioning between each pair of adjacent or proximate supports, proximate the upper ends of the pair of adjacent or proximate supports and atop of the lower panel, an upper panel and coupling side edges of each upper panel to the pair of adjacent or proximate supports via complementary interlocking and mating features, wherein:
the combination of the supports, the lower panels, and the upper panels form or define an enclosure; and
at least one upper panel includes an opening for the passage of fluid from an exterior of the enclosure to an interior of the enclosure, and
wherein each coupled complementary interlocking and mating feature includes the side edge of the panel in contact with or engaged with the body of the support.

13. The method of claim 12, wherein step (c) includes positioning a lower edge of the upper panel in contact with an upper edge of the lower panel.

14. The method of claim 12, further including coupling together lower ends of supports that are positioned apart from each other by a means for linking.

15. The method of claim 12, further including the side edge of the panel and the body of the support include surfaces that contact or engage at an angle transverse to a direction that extends directly from the side edge of the panel to the body of the support.

* * * * *